United States Patent
Mackenzie

(10) Patent No.: US 9,445,407 B2
(45) Date of Patent: Sep. 13, 2016

(54) DYNAMIC SETTING OF TRANSMISSION TIME IN A CONTENTION BASED WIRELESS SYSTEM

(71) Applicant: BRITISH TELECOMMUNICATIONS PUBLIC LIMITED COMPANY, London (GB)

(72) Inventor: Richard Thomas Mackenzie, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 46 days.

(21) Appl. No.: 14/388,540

(22) PCT Filed: Mar. 27, 2013

(86) PCT No.: PCT/GB2013/000141
§ 371 (c)(1),
(2) Date: Sep. 26, 2014

(87) PCT Pub. No.: WO2013/144549
PCT Pub. Date: Oct. 3, 2013

(65) Prior Publication Data
US 2015/0043478 A1    Feb. 12, 2015

(30) Foreign Application Priority Data
Mar. 29, 2012  (EP) .................................. 12250075

(51) Int. Cl.
*H04W 72/04* (2009.01)
*H04W 74/08* (2009.01)
(Continued)

(52) U.S. Cl.
CPC ......... *H04W 72/0413* (2013.01); *H04W 74/08* (2013.01); *H04W 88/08* (2013.01); *H04W 84/12* (2013.01)

(58) Field of Classification Search
None
See application file for complete search history.

(56) References Cited

U.S. PATENT DOCUMENTS

2004/0258039 A1* 12/2004 Stephens ............... H04L 1/0006
                                                         370/349
2008/0232339 A1   9/2008 Yang et al.
(Continued)

FOREIGN PATENT DOCUMENTS

WO   WO 2007/025160   3/2007
WO   2011/095669      8/2011

OTHER PUBLICATIONS

Ksentini et al., "Adaptive Transmission Opportunity with Admission Control for IEEE 802.11e Networks", *MSWiM '05*, Oct. 10-13, 2005, Montreal, Quebec, Canada, pp. 234-241 (8 pgs.).
(Continued)

*Primary Examiner* — Duc Duong
(74) *Attorney, Agent, or Firm* — Nixon & Vanderhye PC

(57) ABSTRACT

In a wireless communications network, access points and connected mobile devices transmit data via a radio frequency spectrum channel. When a device has packets for transmission it must check the channel is available before it can transmit the data. Furthermore there is a Transmission Opportunity (TXOP) parameter which limits the maximum amount of time that a device can transmit packets before it must relinquish the channel so that other devices are not locked out. Each device in the network is capable of updating its own TXOP parameters in order to respond to changes in the level of interference and contention in the surrounding area. In this way devices can transmit for longer periods of time when contention is low, while responding to increased network contention by shortening the TXOP to ensure fair access for all other devices in the network.

18 Claims, 6 Drawing Sheets

(51) Int. Cl.
*H04W 88/08* (2009.01)
*H04W 84/12* (2009.01)

(56) References Cited

U.S. PATENT DOCUMENTS

| | | | | |
|---|---|---|---|---|
| 2009/0147765 A1* | 6/2009 | Chen | .................. | H04L 12/5693 370/345 |
| 2009/0310578 A1* | 12/2009 | Convertino | ......... | H04W 76/043 370/338 |
| 2010/0208579 A1* | 8/2010 | Stephens | ............... | H04W 74/02 370/216 |
| 2011/0003612 A1 | 1/2011 | Roy et al. | | |
| 2011/0103352 A1* | 5/2011 | Wentink | ............. | H04W 74/008 370/336 |
| 2012/0120944 A1* | 5/2012 | Yang | ........................ | H04L 7/04 370/350 |
| 2012/0182886 A1* | 7/2012 | Ong | .................. | H04W 74/0816 370/252 |
| 2012/0218983 A1* | 8/2012 | Noh | ..................... | H04B 7/0452 370/338 |
| 2012/0294142 A1* | 11/2012 | Kneckt | ............... | H04W 74/002 370/229 |

OTHER PUBLICATIONS

International Search Report for PCT/GB2013/000141, mailed May 15, 2013.
Zul Azri Bin Muhamad Noh et al., "A Packet Scheduling Scheme for Audio-Video Transmission over Error-Prone IEEE 802.11e HCCA Wireless LANs", Graduate School of Engineering, Nagoya Institute of Technology, Japan and Faculty of Health Sciences, Nihon Fukushi University, Japan, 2009 IEEE (5 pgs.).

* cited by examiner

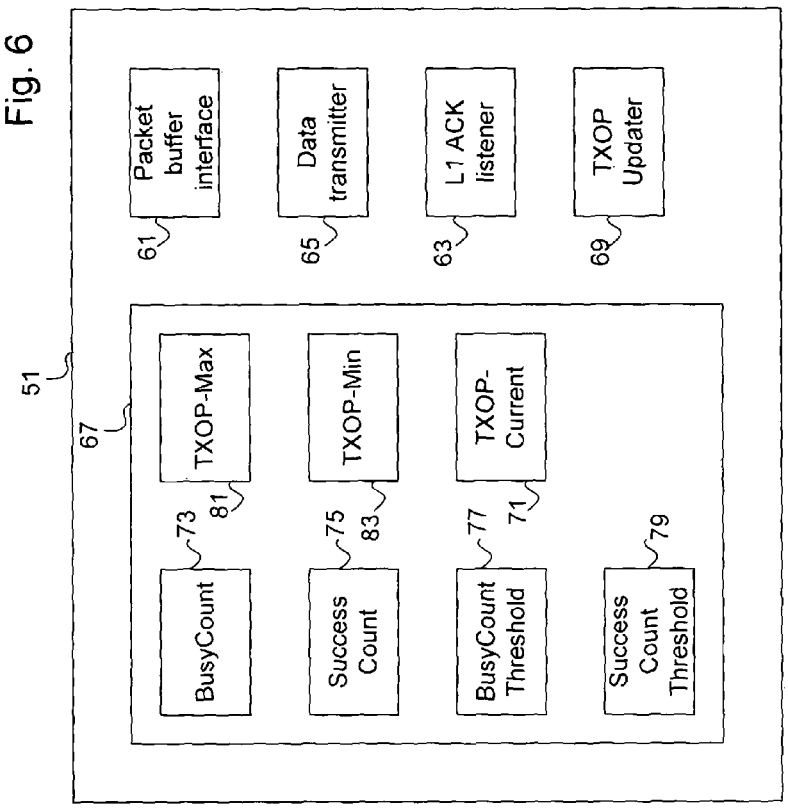
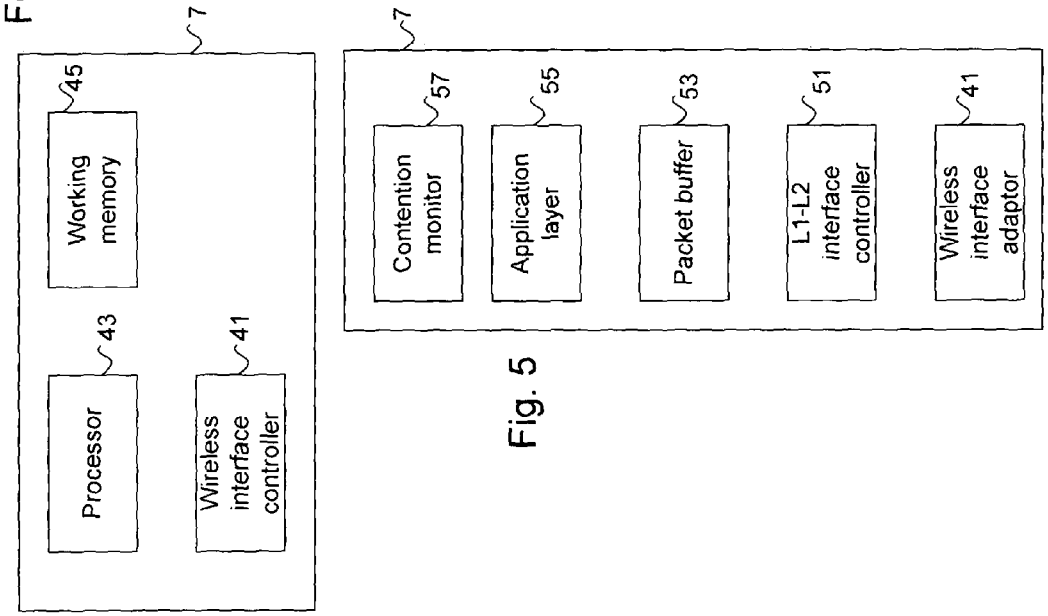

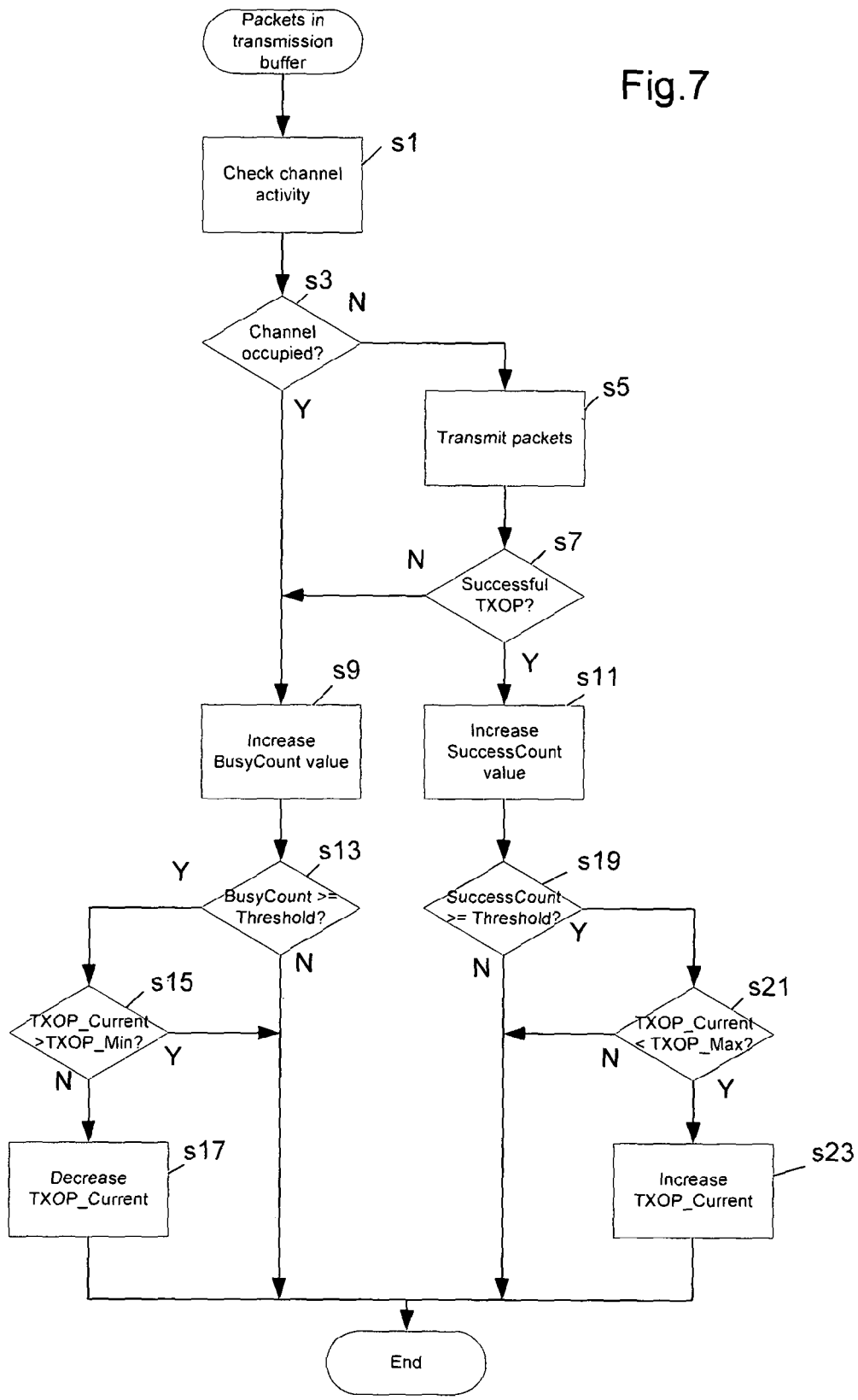

DYNAMIC SETTING OF TRANSMISSION TIME IN A CONTENTION BASED WIRELESS SYSTEM

This application is the U.S. national phase of International Application No. PCT/GB2013/000141 filed 27 Mar. 2013 which designated the U.S. and claims priority to EP Patent Application No. 12250075.4 filed 29 Mar. 2012, the entire contents of each of which are hereby incorporated by reference.

The present invention relates to wireless communication networks in particular to a method of transmitting data packets within the network with regard to the current level of contention in the network.

INTRODUCTION

In wireless communication networks, transmission between devices is via the radio frequency spectrum and therefore this presents different transmission and reception challenges to those encountered in wired communication networks.

In particular in a multiple access network in which many devices may wish to communicate at the same time over the common radio frequency spectrum, typically using an air medium, there is a high chance of the transmissions interfering with each other. Various standards have been proposed an implemented to address this issue, for example, the IEEE 802.11 family of standards require devices to comply with the Carrier Sense Multiple Access with Collision Avoidance (CSMA/CA) wireless network multiple access method. This method aims to avoid collisions which should therefore mean that usually only one device transmits on the channel at any particular time.

When devices wish to transmit data, they first perform a sensing which involves listening on the transmission channel for a predetermined period of time to determine if another device is already transmitting data. If the channel is not free, then a back-off procedure is invoked where the device is configured to defer its transmission and waft for a random period of idle time to pass before attempting to transmit data.

A problem can arise where a device on the wireless network is a slow transmitter and once it has gained the channel, the CSMA/CA behaviour prevents other devices from transmitting even if they have higher priority data to transmit. The Enhanced Distributed Channel Access (EDCA) transmission method addresses this problem, by assigning priorities to each device so that higher priority devices wait a smaller amount of idle time between transmission attempts.

EDCA also places a limit on the amount of time that a device can own the channel for transmission. This is defined as a Transmission Opportunity (TXOP). Once a device starts to transmit data, assuming transmission attempts are being successfully sent, then it can continue to do send data until either it has run out of packets or the time period defined by the TXOP parameter has elapsed. If there are still packets to be transmitted at the end of the TXOP period, then the device must perform the back-off again and wait until it is free.

Often the default values for TXOP are hardwired into the 802.11 compliant chipsets so that all of the devices initially have a common set of values. The access point for the network can also store a default values for TXOP and furthermore can send parameter updates or changes. This centrally controlled TXOP value ensures consistent access to devices requiring access to the communication channel but the behaviour using these default values can lead to several problems.

The present invention aims to address these problems.

STATEMENTS OF INVENTION

In one embodiment the present invention provides a method of transmitting data packets in a wireless communications network (5) formed of a plurality of network devices (3, 7) communicating via a wireless transmission channel; the method comprising the steps of: testing whether the wireless transmission channel is available; and attempting to transmit data packets for a period of time defined in a maximum allowable transmission time parameter; characterised by the steps of: monitoring the number of successful and unsuccessful transmission attempts; and changing the value of the maximum allowable transmission time parameter (71) for future data transmissions.

In another aspect, a wireless communications device for use in a wireless communications network formed of a plurality of network devices and operable to communicate via a wireless transmission channel; the device comprising: testing means for testing whether the wireless transmission channel is available; and transmission means for attempting to transmit data packets for a period of time defined in a maximum allowable transmission time parameter; characterised by: monitoring means for monitoring the number of successful and unsuccessful transmission attempts; and updating means for changing the value of the maximum allowable transmission time parameter (71) for future data transmissions.

A wireless communications network comprising: a wireless access point; and at least one mobile device configured, to perform the method according to any of claims 1 to 5.

LIST OF FIGURES

Embodiments of the invention will now be described with reference to the following figures, in which:

FIG. 1 shows an overview of the network components in a first embodiment of the invention;

FIG. 2 schematically shows the physical components of an access point illustrated on FIG. 1;

FIG. 3 schematically shows the functional components of the access point illustrated in FIG. 2;

FIG. 4 schematically shows the physical components of a mobile device illustrated in FIG. 1;

FIG. 5 schematically shows the functional components of the mobile device illustrated in FIG. 4;

FIG. 6 schematically shows the functional components of the L1-L2 interface controller illustrated in FIG. 5;

FIG. 7 is a flowchart showing the operation of the L1-L2 interface controller when there are packets for transmission;

DESCRIPTION

First Embodiment

Figure 1:
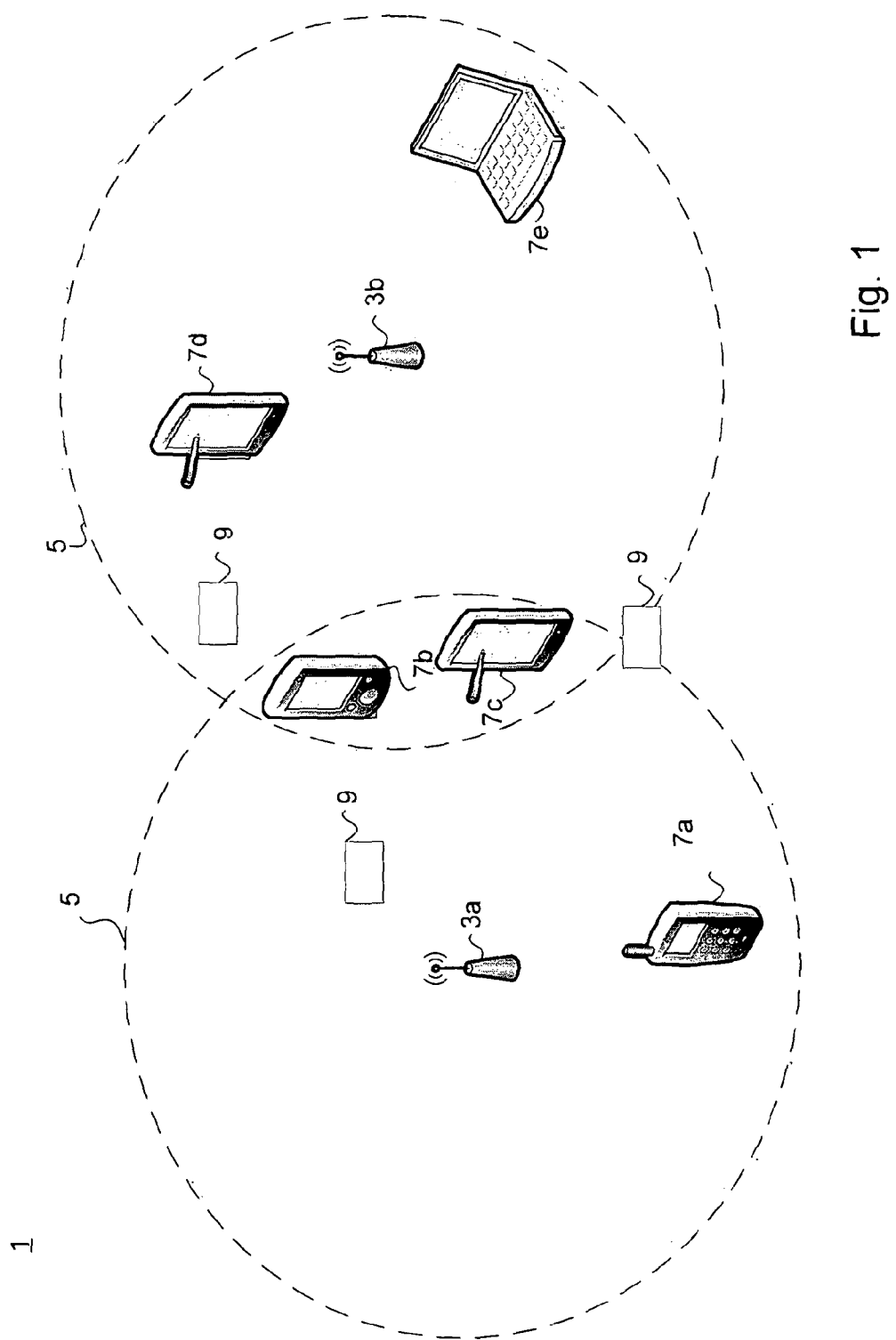

FIG. 1 shows an overview of the network components in the first embodiment. In this embodiment a geographical area 1 has two wireless access points 3 conforming to the IEEE802.11n standards. Each wireless access point has antennae (not shown) which respectively broadcast WiFi signals over a surrounding area so as to define a WiFi zone 5 which extends around the access point 3.

Mobile devices 7 are shown in locations within at least one of these WiFi zones 5 and can therefore access network services such as the Internet via communication With at least one of the access points 3. In FIG. 1, mobiles devices 7a and 7b are arranged to communicate via access point 3a whilst devices 7c, 7d and 7e communicate via access point 3b. Mobile devices 7b and 7c are located in the overlapping area of WiFi zones 5 respectively generated by access points 3a and 3b.

In this embodiment, the wireless access points 3 are both operating on WLAN transmission channel 6 which means that the access points and their devices are transmitting and listening for other transmissions at a frequency of 2437 MHz. Since both WiFi zones 5 are overlapping, this means that the transmissions of devices belonging to one WiFi zone 5 will also be received by devices belonging to devices in the other WiFi zone 5 and hence is a type of interference since they are competing for the same frequency spectrum.

Furthermore, the WiFi zones 5 specific the range of the access point 3 for sending and receiving wireless data signals. However, since wireless signals propagate in all directions, when a mobile device 7 transmits, the transmission will extend across an area around the device. Therefore the mobile device 7 may experience interference from another wireless device which is within the mobile device's transmission range but outside of the transmission range of the wireless access point.

Also shown are other devices which do no connect to the wireless access points but nevertheless transmit radio frequency signals within the same frequency range as the wireless access points 3. This can cause significant disruption to WiFi data transmissions since these other devices do not regulate the transmission powers of their transmissions and may therefore drown out other signals on the same frequency. Furthermore, any transmissions typically last for a long time and the transmissions themselves may not be restricted to a tight frequency range. These other devices will be referred to as interference devices 9 and include microwaves, wireless microphones and other devices operating in the 2.4 GHz frequency range.

Therefore it can be seen in the above system that WiFi transmissions are vulnerable to many different types of interference from different sources. Since the source of the interference is often external to the WiFi system and therefore cannot be directly controlled, each WiFi zone experiences changes to the available bandwidth for its own transmissions. This can be regarded as a change in the level of contention for the shared resource caused either by an increase in the number of devices contending for the channel, or a reduction in the total amount of channel resource.

In the first embodiment, the mobile devices 7 in communication via the wireless access points 3 use improved processing logic in order to use the available bandwidth in a more efficient fashion. Rather than having a predetermined and fixed maximum transmission time (TXOP) which is set by default values in the access point, each device's utilisation of the transmission channel is varied depending on the level of contention in the network. When many devices require the channel, then each device modifies its own, parameters to reduce the amount of time it will hold the channel. Conversely, during low contention periods, each device can transmit for a longer period of time.

Figure 2:
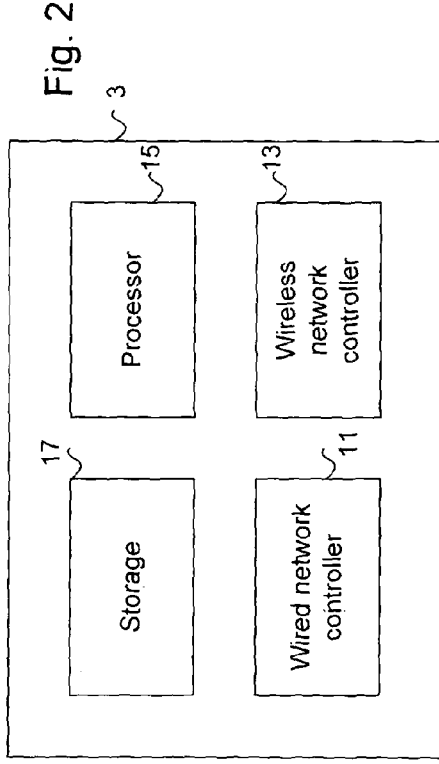

FIG. 2 shows the physical components of an access point 3 in accordance with the first embodiment. Each access point 3 includes a wired network controller 11, a wireless network controller 13, a processor 15 and storage unit 17.

As is conventional, the wired network controller 11 is an Ethernet controller which connects to a wide area network such as the Internet. The wireless network controller 13 is an IEEE 802.11n standard compliant network adaptor providing wireless connectivity in one of thirteen frequency bands at the 2.4 Ghz frequency.

The operation of the access point is controlled by software instructions stored in storage unit 17 and executing on processor 15. When executing, the modified behaviour of the processor logic can be visualised as several functional components.

Figure 3:
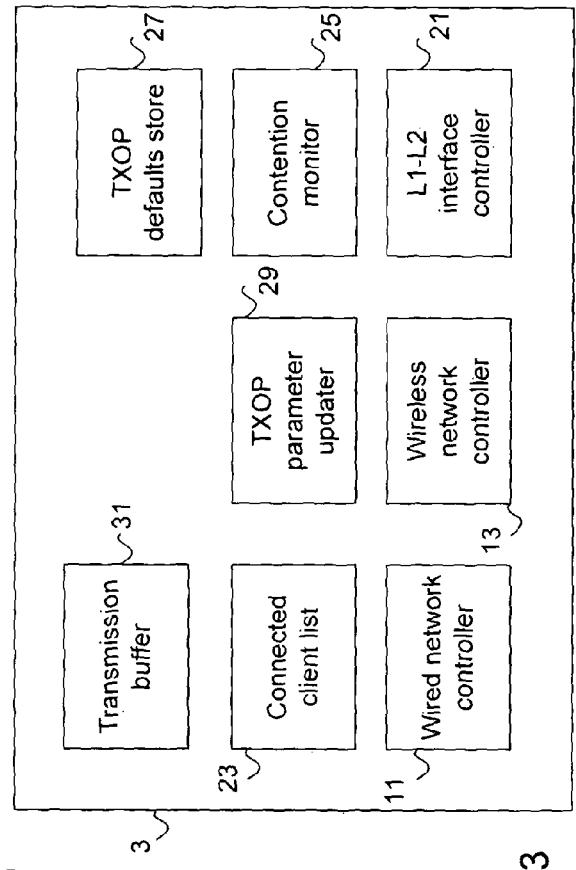

FIG. 3 shows the functional components view of the access point 3. In this embodiment, wired network controller 11 and wireless network controller 13 are also shown.

In addition to the network interfaces 11, 13, the software implemented functional components include: a L1 to L2 interface controller 21, a connected client list 23, a contention monitor 25, a TXOP defaults store 27, a TXOP parameter updater 29 and a transmission buffer 31.

The L1 to L2 interface controller is situated between the wireless network controller 13 and the transmission buffer 31, and also the transmission buffer 31 and the wired network controller 11. In this embodiment, it is a software driver that controls the behaviour of the wireless network controller 13 in a conventional manner.

The access point 3 needs to be aware of the mobile devices 7 which are connected to the access point 3. Therefore the identities of any mobile devices (MAC address of the mobile device) which associate with the access point 3 as well as the allocated IP address are stored in the connected client list 23.

To listen for a free communication channel, a contention monitor 25 is responsible for causing the wireless network controller to enter a listening state to determine whether the channel is occupied, i.e. whether another device is already transmitting at that moment in time.

The TXOP defaults store 27 stores the default values which the TXOP parameter updater 29 sends to mobile devices 3 when they first connect to the access point. The values include a current TXOP value as well as maximum and minimum values as will be described later.

FIG. 4 shows the physical components of each mobile device in this embodiment. Each mobile device contains a wireless interface controller 41, a processor 43 and working memory 45. The other conventional components such as a display screen, user inputs and cellular communications equipment (in mobile phone devices) have not been shown as they do not form part of the invention.

The wireless interface controller 41 is compliant with the IEEE802.11n standards and can therefore communicate with the wireless access point 3 via the network controller 13. The processor 43 executes control logic based on program instructions stored in working memory 45 in order to control the operation of the mobile device 7.

When such program instructions are running on the mobile device 7, several functional components can be defined as shown in FIG. 5.

FIG. 5 shows the functional components of the mobile device 7 in the first embodiment. Wireless interface controller 41 is connected to an L1-L2 interface controller 51 which includes further capabilities compared with the functionality of the L1-L2 interface controller 21 of the access, point 3.

The L1-L2 interface controller 51 controls the operation of the wireless interface controller 41 in sending data packets stored in a packet buffer 53. The packets are generated by programs in the application layer 55. A contention monitor 57 functions in the same way as the contention monitor in the access point in checking the utility of the wireless channel before the mobile device 7 is allowed to transmit packets.

FIG. 6 shows the functional components of the L1-L2 interface controller 51 of the mobile device 3.

As shown, the L1-L2 interface controller 51 includes: a packet buffer interface 61, an L1 ACK listener 63, a data transmitter 65, a TXOP parameter store 67 and a TXOP Updater 69.

The packet buffer interface 61 accesses the packet buffer 53 so that it knows when there are packets waiting to be sent. When a mobile device 3 decides to contend for the channel, it will confirm that the channel is idle using a conventional random back-off technique and following the rules of the back-off technique, the station will eventually start the first transmission of its TXOP on the wireless channel. It will continue to send data, assuming they continue to be correctly received, until there are no more packets to be sent or the TXOP time period has elapsed. As each packet is sent, the L1 ACK listener 63 listens for responses from each packet's destination device so that the capability to retransmit lost packets can be supported.

The TXOP parameter store 67 and TXOP Updater 69 collectively modify the standard behaviour of the mobile devices 7 and access points 3 to adapt to the contention in the network.

Parameter store 67 contains parameters used by the TXOP Updater as will be described below. In this embodiment, there are four sets of parameters corresponding to each of the 802.11 traffic classes. For ease of explanation only, one of the parameter sets will be described and shown in FIG. 6. The set contains the following variable counters: a current TXOP value stored in a TXOPCurrent field 71, an unsuccessful transmission attempt counter value stored in a BusyCount field 73, a successful transmission attempt counter value stored in a SuccessCount field 75, a BusyCount threshold value stored in BusyCountThreshold, field 77, a SuccessCount threshold value stored in SuccessCount-Threshold field 79. Furthermore the parameter store 67 includes a maximum TXOP value in TXOP-Max field 81 and a minimum TXOP value in TXOP-Min field 83.

The values for these parameters are sent from the TXOP defaults stored 27 of the access point 3 as an additional step of WiFi association between the access point 3 and the mobile device 7.

The operation of the TXOP Updater 69 to alter the value of TXOPCurrent in the TXOPCurrent field 71 will be described with reference to FIG. 7.

When the packet buffer interface 61 detects at least one packet in the packet buffer 53, contention monitor is enabled in step s1 to check for any existing channel activity indicative of another WiFi mobile device currently transmitting.

In step s3, a test is carried out to determine the actions of the mobile device based on the observed channel activity. If the channel is free, then processing proceeds to step s5 where the data transmitter 65 attempts to send the packets in the packet buffer. If the channel is not free, then processing proceeds to step s9 which will be described later.

When the channel is free, at step s7, the ACK receiver determines whether the TXOP was successful. A successful TXOP is deemed to be the case whereby all of packets in the buffer are successfully transmitted or where all transmission attempts in the TXOP were successful and TXOPCurrent is not long enough for further transmission attempts.

If the TXOP was not successful, then processing proceeds to step s9. This may be due to interference from a non-compliant wireless device 9 or the mobile device 7 losing connection to the access point 3 due to it moving out of range. Another possibility is that another 802.11 compliant device starts transmitting because it cannot correctly verify that the channel is clear before it starts transmitting.

As mentioned early, the TXOP parameters include a BusyCount variable and a SuccessCount variable. BusyCount represents the number of times the channel has either been busy during the channel test in step s3 or a TXOP has failed. If the mobile device tries many times to obtain the channel but finds that it is frequently busy, then this may be indicative of high contention on that frequency channel. In step s9, the BusyCount is incremented and in step s13 another test is performed to compare the current value of BusyCount to a predetermined threshold store in the BusycountThreshold field 77 of the parameters store 67. If the value of BusyCount is below the threshold 77 the processing ends.

If the value of BusyCount is above the threshold then in step s15 another test is performed to check whether the current value of TXOPCurrent is equal to or lower than the minimum TXOP value specified by the access point 3 and stored in the TXOP-Min field 83 in the parameters store 67. If the current TXOP value is lower than the minimum value then processing ends. However, if the current TXOP value is higher than the minimum value, then in step s17 the value of TXOPCurrent is reduced by a predetermined value. In this way, the mobile device recognises that contention has increased within the network and therefore it shortens the maximum amount of time it will transmit in one TXOP. Furthermore, the value of both BusyCount and SuccesCount are reset to zero. Since all the other mobile devices in the network also perform this processing and react in the same way, then the group of devices react to increased contention in order to shorten their TXOP values to improve access for all devices.

In contrast, when the mobile device often finds the channel to be available, this is indicative of low contention in the network. After each successful TXOP determination in step s7, the value of SuccessCount is incremented in step s11.

At step s19, the value of SuccessCount is compared against a threshold SuccessCount Threshold 79. If the SuccessCount value is below the threshold, then processing ends. However, if the value is above the threshold, then in step s21 another test is performed to compare the current TXOP value against the TXOP-Max value 81 in the parameters store 67. If the value is equal to or higher than the TXOP-Max value then processing ends. However, if the value of TXOP is less than the value of TXOP Max, then in step s23 the value of the current TXOP is increased so that more data can be potentially transmitted before needing, to send data in a new TXOP window and furthermore the value of both BusyCount and SuccessCount are reset to zero. After step s23 processing ends for this TXOP update cycle. If there are still more packets to be sent, then processing returns to step s1.

As described above, the proposed TXOP management scheme allows each mobile device to react to observed contention in the network to alter its transmission behaviour. Reducing its TXOP size when contention is high to ensure fair access to other devices and increasing its TXOP size when contention is low so that the device can transmit longer bursts of information to reduce transmission overhead.

This distributed method of each network device controlling its own TXOP parameters improves the efficiency of channel utilisation.

Second Embodiment

In the first embodiment, the mobile devices 7 use the TXOP updater functionality to modify their transmission characteristics in dependence upon the level of contention in the network. Typically mobile devices send data to the access point for onward transmission to remote devices on the Internet rather than other devices on the same wireless access network. Therefore only traffic which is being sent from the devices to the access point is optimised in the upload direction.

In the second embodiment, the access points are also modified to alter their TXOP values based on the level of contention in the network. In this way, the operation of the network for both uploads and downloads are improved as the access point is also able to increase the length of its TXOP transmission periods when contention is low, while reducing the TXOP value when the contention is higher.

Figure 8:
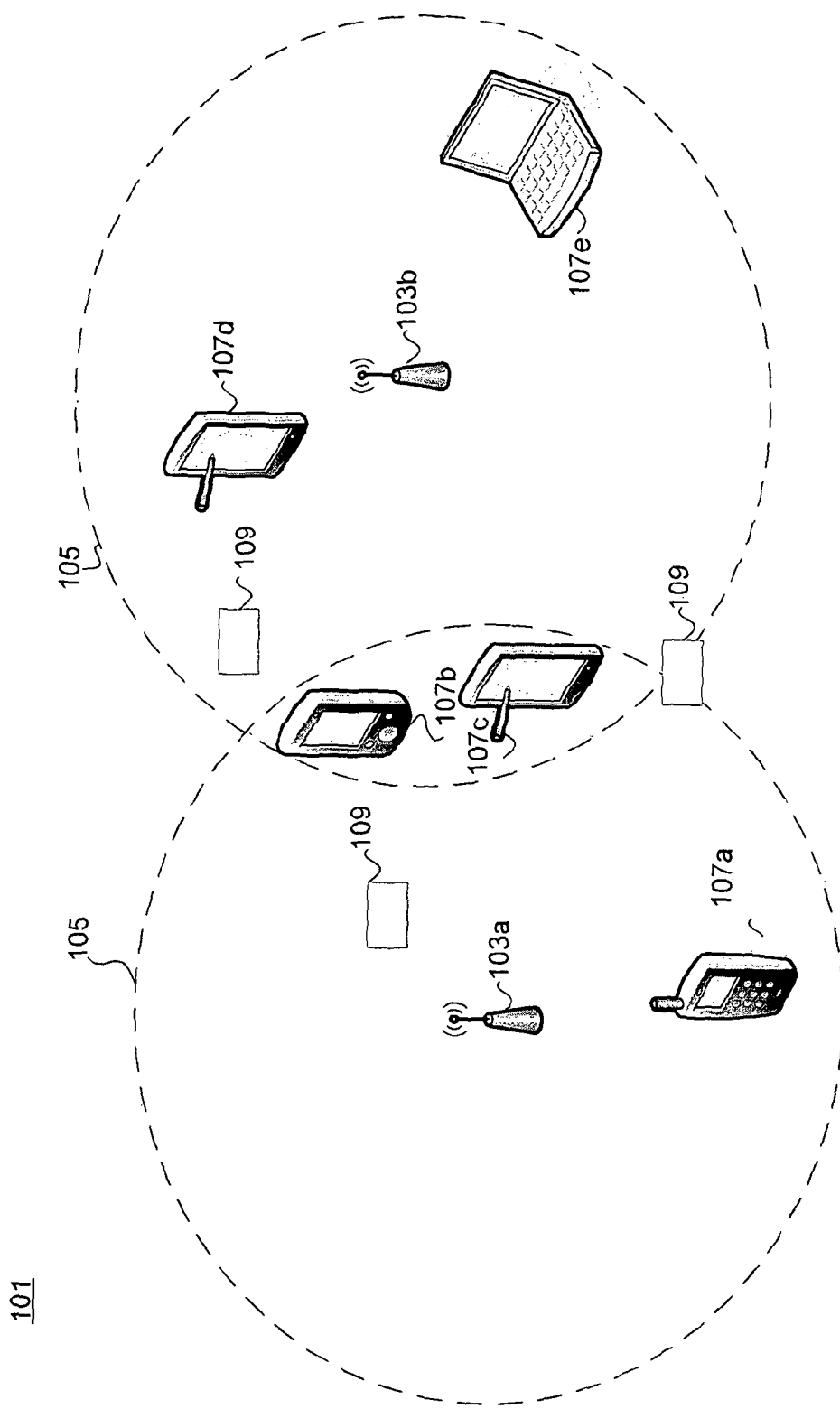
FIG. 8 shows an overview of the network components in a second embodiment of the invention.

FIG. 8 shows the network components of the second embodiment. Mobile devices 107 behave as mobile devices 7 in the first embodiment and interference devices 109 behave as interference devices 9 in the first embodiment.

Access points 107 are similar to the access points of the first embodiment but contain L1-L2 controllers which perform the same processing as the mobile devices in the first embodiment as shown in FIG. 7.

Alternatives and Modifications

In the embodiments, the access points established WiFi zones transmitting on the same WLAN channel. It will be clear to those skilled in the art that the access points could transmit on any of the fourteen available WLAN channels and interference between WiFi zones would be reduced as the channels in use are further apart in, the frequency domain.

Similarly, in the embodiment, the access points and mobile devices communicate in accordance with the 802.11n standards but it will be clear to those skilled in the art that the devices could communicate using any other wireless network communication without departing from the teaching of the invention to manage TXOP based on contention.

In the embodiment, the TXOP value is decreased and increased by the same amount. This means that the device alters its behaviour by the same degree depending on the BusyCount and SuccessCount hitting different thresholds. In an alternative, the rate at which the TXOP value is decreased when the BusyCount Threshold is reached is different to the increase rate of TXOP. In this way, each device backs off its TXOP period more quickly when contention increases.

Figure 9:
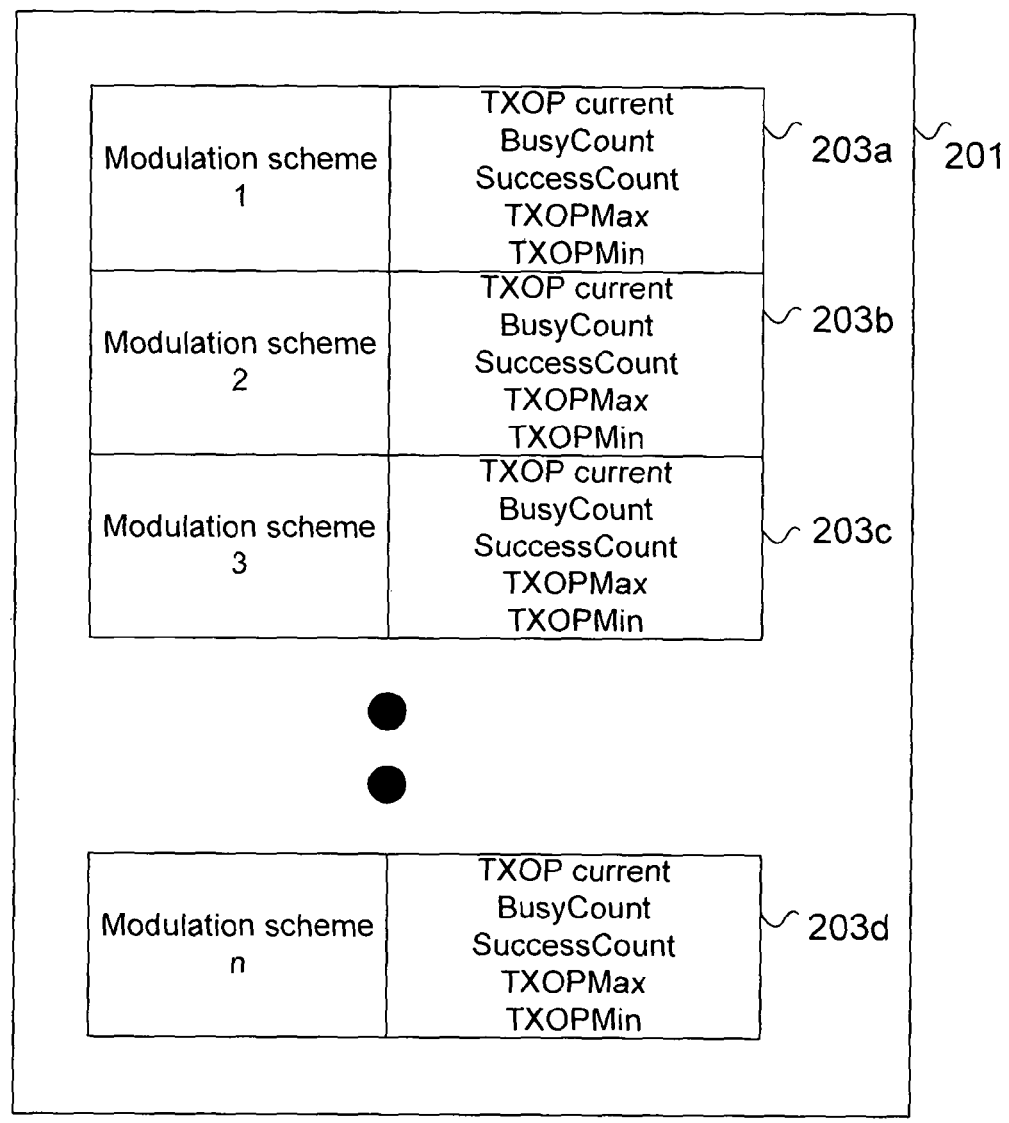
FIG. 9 shows the contents of the TXOP parameters store in an alternative.

In the embodiment, there is a set of TXOP parameters for each traffic class. However in WiFi, there are many different modulation schemes, a particular scheme being chosen in dependence on the signal quality between the access point and the mobile device. In an alternative, each device maintains a different set of TXOP parameters per modulation scheme and the contention behaviour is different depending on the modulation scheme in use. Such a parameter store 201 is shown in FIG. 9 in which different sets of parameters 203 are stored and independently updated in accordance with the modulation scheme in use.

In one further modification, when the TXOPCurrent for any given modulation changes, all corresponding TXOPCurrent for the different modulation schemes is also updated.

The TXOP protocol allows different devices to have different priorities and their behaviour when the contention monitor determines that the channel is busy is dependent on the device priority. High priority devices have a shorter back-off period and therefore wait a shorter period of time before testing the channel again. Low priority devices wait a longer period of time. In the embodiment, the TXOP processing does not alter the back-off period. However in an alternative, when there is low contention and TXOP value is increased, the length of the back-off period is also decreased. Similarly, when the contention is deemed to be higher, the TXOP value is decreased and the back-off period is increased slightly.

In the embodiments, the default values for the TXOP parameters are received from the access point. However in an alternative, the mobile devices are pre-loaded with default values and only change these default thresholds, maximum and minimum values if the access point sends an update message containing new values.

In a further modification, the mobile devices can feed their TXOPCurrent values back to the access point in order to provide the access point with more information on the level of contention in the network. The received values are used to update the default TXOP parameters which can be sent to new devices joining the WiFi zone 5.

In the embodiments, the values of BusyCount and SuccessCount are both reset when either of the counters reaches the respective threshold. In an alternative, the counters are rest independently.

It is also desirable to avoid stale data in the TXOP parameters, for example if a device transmits some packets so that BusyCount and SuccessCount are not zero but then goes idle for a long period of time, when it next has packets to transmit, the state of the TXOP parameters will not be an accurate reflection of the current level of contention in the network. Therefore, in a modification, the TXOP Updater includes a reset function which resets the value of Busycount and SuccessCount to their initial values after a predetermined period of idle state. The TXOPCurrent may be reset or allowed to stay the same.

In the processing of FIG. 7, in steps s15 and s21, the value of TXOPCurrent can drop below TXOP-Min and also exceed TXOP-Max because the size of the decrements and increments to TXOPCurrent may be larger than one. In an alternative the value of TXOPCurrent is not allowed to drop below TXOP-Min or exceed TXOP-Max. Step s15 is replaced with a test to check whether decrementing TXOPCurrent by the decrement amount would make the value of TXOPCurrent drop below TXOP-Min. If it would, then processing ends. If it would not, then processing proceeds to step s17. Conversely, step s21 is replaced with a test to check whether incrementing TXOPCurrent by the increment value would cause TXOPCurrent to exceed TXOP-Max. If so, then processing ends, if not, then processing proceeds to step s23 as in the first embodiment.

The invention claimed is:

1. A method of transmitting data packets in a wireless communications network formed of a plurality of network devices including an access point and a mobile device communicating via a wireless transmission channel; the method comprising the steps of:

testing whether the wireless transmission channel is available;

attempting to transmit data packets for a period of time defined in a maximum allowable transmission time parameter;

monitoring the number of successful and unsuccessful transmission attempts;

changing the value of the maximum allowable transmission time parameter for future data transmissions;

receiving, at the access point, the maximum allowable transmission time parameter from the mobile device; and determining, at the access point, a level of contention in the wireless communications network based on the maximum allowable transmission time parameter.

2. A method according to claim 1, wherein the monitoring step comprises:

counting the number of successful and unsuccessful transmission attempts, and the value of the maximum allowable transmission time parameter is changed in dependence on the count.

3. A method according to claim 2, wherein the changing step comprises:

decreasing the value of the maximum allowable transmission time parameter when the number of unsuccessful transmission attempts exceeds a first threshold; and increasing the value of the maximum allowable transmission time parameter when the number of successful transmission attempts exceeds a second threshold.

4. A method according to claim 3, wherein the rate at which the value of the maximum allowable transmission time parameter is decreased is different from the rate at which the value of the maximum allowable transmission time parameter is increased.

5. A method according to claim 2, comprising resetting the count of successful and unsuccessful transmission attempts.

6. A wireless communications network comprising:
a wireless access point; and
at least one mobile device configured to perform the method according to claim 1.

7. A wireless communications network comprising a wireless access point and at least one mobile device, wherein the wireless access point is configured to perform the method according to claim 1.

8. A method according to claim 1, wherein the step of attempting to transmit data packets for a period of time defined in a maximum allowable transmission time parameter occurs after a back-off period time parameter has expired, and the method further comprises the step of:

changing the value of the back-off period time parameter based on the number of successful and unsuccessful transmission attempts.

9. A wireless communications device for use in a wireless communications network formed of a plurality of network devices including an access point and a mobile device and operable to communicate via a wireless transmission channel; the device comprising:

testing means for testing whether the wireless transmission channel is available;

transmission means for attempting to transmit data packets for a period of time defined in a maximum allowable transmission time parameter;

monitoring means for monitoring the number of successful and unsuccessful transmission attempts;

updating means for changing the value of the maximum allowable transmission time parameter for future data transmissions; wherein the transmission means is also for sending the maximum allowable transmission time parameter to the access point, and the monitoring means is operable to count the number of successful and unsuccessful transmission attempts, and the value of the maximum allowable transmission time parameter is changed in dependence on the count.

10. A wireless communications device according to claim 9, wherein the updating means is operable to:

decrease the value of the maximum allowable transmission time parameter when the number of unsuccessful transmission attempts exceeds a first threshold; and increase the value of the maximum allowable transmission time parameter when the number of successful transmission attempts exceeds a second threshold.

11. A wireless communications device according to claim 10, wherein the rate at which the value of the maximum allowable transmission time parameter is decreased is different from the rate at which the value of the maximum allowable transmission time parameter is increased.

12. A wireless communications device according to claim 9, comprising resetting means for resetting the count of successful and unsuccessful transmission attempts.

13. A wireless communications device accordingly to claim 9, wherein the transmission means is for attempting to transmit data packets for a period of time defined in a maximum allowable transmission time parameter after a back-off period time parameter has expired; and the updating means is also for changing the value of the back-off period time parameter based on the number of successful and unsuccessful transmission attempts.

14. A wireless communications device for use in a wireless communications network formed of a plurality of network devices including an access point and a mobile device and operable to communicate via a wireless transmission channel; the device comprising:

a processing system, including a processor and a memory, the processing system being configured to:

test whether the wireless transmission channel is available;

attempt to transmit data packets for a period of time defined in a maximum allowable transmission time parameter;

monitor the number of successful and unsuccessful transmission attempts;

change the value of the maximum allowable transmission time parameter for future data transmissions; and send the maximum allowable transmission time parameter to the access point, wherein the processing system is further configured to count the number of successful and unsuccessful transmission attempts, and the value of the maximum allowable transmission time parameter is changed in dependence on the count.

15. A wireless communications device according to claim 14, wherein the processing system is further configured to:

decrease the value of the maximum allowable transmission time parameter when the number of unsuccessful transmission attempts exceeds a first threshold; and increase the value of the maximum allowable transmission time parameter when the number of successful transmission attempts exceeds a second threshold.

16. A wireless communications device according to claim 15, wherein the rate at which the value of the maximum allowable transmission time parameter is decreased is different from the rate at which the value of the maximum allowable transmission time parameter is increased.

17. A wireless communications device according to claim 14, wherein the processing system is further configured to reset the count of successful and unsuccessful transmission attempts.

18. A wireless communications device accordingly to claim 14, wherein the processing system is further configured to:
  attempt to transmit data packets for a period of time defined in a maximum allowable transmission time parameter after a back-off period time parameter has expired; and
  change the value of the back-off period time parameter based on the number of successful and unsuccessful transmission attempts.

* * * * *